United States Patent Office 3,515,691
Patented June 2, 1970

3,515,691
WAX POLYMER COATING COMPOSITIONS
Karekin G. Arabian, Walnut Creek, Calif., assignor to Shell Oil Company, New York, N.Y., a corporation of Delaware
No Drawing. Filed May 29, 1967, Ser. No. 642,183
Int. Cl. D21h *1/36, 1/40;* C08d *13/16*
U.S. Cl. 260—28.5                                    1 Claim

ABSTRACT OF THE DISCLOSURE

A wax polymer coating composition resistant to peeling and cracking at low temperatures and having good scuff resistance comprising (a) a paraffin wax having a melting point of 130 to 150° F., (b) a scuff resistant wax having a melting point of 170 to 190° F., (c) polyethylene and (d) an ethylene vinyl acetate copolymer having a vinyl acetate content of 25–26% by weight.

BACKGROUND OF THE INVENTION

This invention relates to novel wax copolymer compositions. In particular, this invention relates to wax copolymer compositions that have high scuff resistance and high resistance to cracking and peeling away from inked surfaces of frozen food cartons at low temperatures.

For many years low viscosity wax copolymer blends have been used as protective coatings for folding cartons used to package frozen foods. One of the problems associated with packages containing such coatings is that the coatings tend to crack or peel away from the inked areas of the cartons when they are cooled to the low temperatures required for frozen foods, e.g., −20 to −60° F. This defect has been called "freezer burn" by the industry.

Various attempts have been made to improve the freezer burn situation. However, in order to improve freezer burn some other essential property of the wax polymer blend has had to be sacrificed, e.g., scuff resistance, viscosity or polymer wax compatibility. In such blends it is important to maintain high scuff resistance and to ensure that the viscosity of the blends do not exceed 100 cps. at 240° F.

The scuff resistance of a conventional paraffin wax can be improved to a satisfactory level by adding sufficient high melting wax and a polyethylene in the required quantity. However, this combination does not provide a coating that is resistant to freezer burn. Waxes alone are notoriously poor for resistance to freezer burn and the addition of polyethylene does not help this property. Addition of other polymers to improve freezer burn has resulted in liquid incompatibility between the wax and polymer at coating temperatures.

A wax polymer composition has now been discovered that is resistant to freezer burn, homogeneous at coating temperatures, and at the same time has excellent scuff resistance. This composition consists of (a) 50 to 70% by weight basis total composition of a paraffin wax having a melting point of from 130–150° F., (b) 15 to 35% by weight of a scuff resistant wax having a melting point of from 170 to 190° F., (c) 5 to 15% of a polyethylene having a molecular weight of 1500 to 21,000 and (d) 3 to 15% by weight of an ethylene-vinyl acetate copolymer, said copolymer having a vinyl acetate content of from 24 to 26% by weight and an ethylene content of 74 to 76% by weight.

The waxes used in these compositions are fully refined petroleum waxes obtained from the dewaxing of hydrocarbon oils and may be obtained by methods well known in the art, i.e., chilling the oil with the addition of a solvent and separating the precipitated wax by mechanical means such as filters, centrifuges and the like. Synthetic waxes, such as those made by the Fisher-Tropsche process and ester waxes, are also useful as the scuff resistant wax.

The paraffinic wax contains at least 70% n-paraffins and has an ASTM–D 87 melting point between 130 and 150° F., a specific gravity at 60° F. of about .91–.94 gm./ml. and an ASTM–D 1747 refractive index at 100° C. of from 1.420 to 1.430. This wax has a high tensile strength and has good blocking properties. A preferred paraffinic wax within this range has a melting point of 135–145° F. and a refractive index of 1.420–1.426.

The scuff resistant waxes which are essential to the attainment of good freezer burn properties have an ASTM–D 87 melting point of from 170–190° F. and may be either petroleum or synthetic in origin. Preferred are petroleum waxes having a specific gravity at 60° F. of about .93–.95 gm./ml. and an ASTM–D 1747 refractive index at 100° C. from 1.435 to 1.445 and may be either paraffin or microcrystalline in nature. This wax improves the scuff resistance of the blends of this invention. An especially useful petroleum wax within this range has a melting point of 183° F. and a refractive index of 1.437.

The polyethylene useful in this invention has a molecular weight from 1500 to 21,000 and a density of from 0.900 to 0.970. Since the primary function of the polyethylene is to improve the scuff resistance of the blend the amount of polyethylene added will depend upon its molecular weight. High molecular weight polyethylenes or higher density polyethylenes provide greater scuff resistance than do the lower molecular weight or lower density polyethylenes. In general, from about 5 to 15% by weight of polyethylenes may be present in the wax polymer blend.

As noted previously, waxes and polyethylene, in proper combinations can provide coating blends that have good scuff resistance, but do not inhibit freezer burn. What therefore is needed is a component that will improve the adhesion of a wax polyethylene blend to inked areas of carbon board without sacrificing scuff resistance. The choice of this component is critical to the attainment of a freezer burn resistant wax polymer blend. Of the various components tested the ethylene-vinyl acetate copolymers performed best. However, the choice of the specific copolymer within this group is critical. If the vinyl acetate content of the copolymer is too high it will not be compatible with the wax at typical coating temperatures and the blend will separate into two liquid phases. If the vinyl acetate content is too low the blend has poor resistance to freezer burn. It has been discovered that only those ethylene-vinyl acetate copolymers having a vinyl acetate content of 24–26% and an ethylene content of from 74–76% are useful in the present invention and therefore form the fourth component of these blends.

All proportions given in the table are percent by weight, basis total composition.

TABLE I

| Blend No. | Wax A[1] | Wax B[2] | Polyethylene[3] | Ethylene-vinyl acetate | Liquid compatibility [7] | Scuff resistance | Freezer burn | Viscosity at 240° F. (cps.) |
|---|---|---|---|---|---|---|---|---|
| 1 | 62 | 26 | 7 | [4] 5 | Incompatible | Excellent | Excellent | 96 |
| 2 | 62 | 26 | 7 | [5] 5 | Compatible | do | do | 90 |
| 3 | 62 | 26 | 7 | [6] 5 | do | do | Poor | 98 |
| 4 | 59.5 | 23.5 | 7 | [6] 10 | do | do | do | |

[1] Paraffin wax, M.P. 141.6° F., Ref. Index at 212° F. 1.423.
[2] Paraffin wax, M.P. 183° F., Ref. Index at 212° F. 1.437.
[3] Molecular weight about 18,000; density at 23° C. 0.915.
[4] Melt index 125–175; vinyl-acetate content 27–29%.
[5] Melt index 335–465; vinyl-acetate content 24–26%.
[6] Melt index 125–175; vinyl-acetate content 17–19%.
[7] At both 180 and 240° F.

These copolymers are commercially available under various tradenames. The copolymers may be present in the wax polymer blends in any proportion that will prevent freezer burn. However, in order to maintain the viscosity of the blends in the proper ranges at coating temperature, it is preferred to use a minimum copolymer concentration. Especially preferred is a copolymer having a melt index between 335 and 465. The ethylene-vinyl acetate copolymers may be present in the wax polyethylene in an amount from 3 to 15% and preferably from 3 to 8% basis total composition.

These wax polymer blends may also contain small amounts of additives. For example, from .01 to 0.1% of a conventional antioxidant.

The blends of this invention may be prepared in any suitable manner, for example, mechanically mixing the various components in molten form until a homogeneous mixture is obtained. The order of component addition is not critical; however, the waxes are usually melted together first and then the polyethylene and/or ethylene-vinyl acetate copolymer added. The polymers may be added at once in molten form or may be added in small increments in solid or molten form.

The following examples are illustrative of the invention but are not to be construed as limiting the same.

Example I

The wax polymer blends described in the following table were prepared by melting the various components together and mixing to obtain a homogeneous blend. The melted blend was tested for liquid compatibility at 180° F. and 240° F. Each blend was applied, in molten form, to the top side of a 12 point inked paper board, food carton at a coating weight of about 15 lbs./ream. The coated board was subjected to tests to determine its resistance to scuff and freezer burn. To test for freezer burn Dry Ice was placed on the coated carton for one minute. An excellent rating indicates that no cracks or pulling away from the carton was observed in the coating after this time. To test for scuff resistance various weights were added to a strip of sulfite paper which was pulled across the coated surface. The point at which scratches occurred was noted and given a rating. The ratings are based on an arbitrary scale wherein low density polyethylene is given a rating of 20 and a paraffin wax having a melting point of 130 to 142° F. a rating of 0. Any rating of 10 or above is considered to be excellent.

From the above it is obvious that the only blend that possesses all required properties, i.e., polymer wax compatibility, scuff resistance and resistance to freezer burn is Blend No. 2. At vinyl acetate concentrations greater than 26% the copolymer becomes incompatible with the liquid wax thereby causing phase separation to form a heterogeneous blend. At vinyl acetate concentration below 24% the resistance to freezer burn is poor.

Example II

A blend similar in composition to Blend No. 2, above but containing 62% of a microcrystalline wax having a melting point of 141° F. in the place of Wax A shows excellent resistance to freezer burn but has poor scuff resistance.

Example III

Other wax polymer blends showing the same excellent properties relating to liquid compatibility, scuff resistance and resistance to freezer burn as Blend No. 2 in Example I are given in the following table.

TABLE II

| Blend No. | Wax A | Wax B | Polyethylene | Ethylene/vinyl acetate copolymer |
|---|---|---|---|---|
| 5 | 50% 132° F.[1] paraffin wax. | 32% 178° F. melting point microcrystalline wax. | 15% of 2,000 mol. wt., 0.92 density polyethylene. | 3% of 2 M.I.[2] copolymer containing 24–26% vinyl acetate. |
| 6 | 67% 142° F. paraffin wax. | 16% 184° F. melting point paraffin wax. | 10% of 18,000 mol. wt., 0.915 density polyethylene. | 7% of 400 M.I. copolymer containing 24–26% vinyl acetate. |
| 7 | 60% 150° F. paraffin wax. | 28% 190° F. melting point synthetic wax made by Fisher-Tropche process. | 7% of 21,000 mol. wt., 0.918 density polyethylene. | 5% 20 M.I. copolymer containing 24–26% vinyl acetate. |
| 8 | 61% 138° F. paraffin wax. | 15% 170° F. melting point ether wax. | 9% 7,000 mol. wt., 0.908 density polyethylene. | 15% of 400 M.I. copolymer containing 24–26% vinyl acetate. |
| 9 | 65% 146° F. paraffin wax. | 19% 180° F. melting point paraffin wax. | 12% 2,500 mol. wt., 0.927 density polyethylene. | 4% 20 M.I. copolymer containing 24–26% vinyl acetate. |

[1] Temperature, ° F. represents melting point of the waxes.
[2] M.I. represents melt index, g./10 min., ASTM D-1238.

I claim as my invention:
1. A scuff resistant, freezer burn resistant wax composition consisting essentially of (a) about 62% by weight of a paraffin wax having a melting point of 130°–150° F.; (b) about 26% by weight of a petroleum wax having a melting point of about 183° F. and a refractive index at 100° C. of about 1.437, (c) about 7% by weight polyethylene having a molecular weight of about 18,000 and (d) about 5% by weight of an ethylene-vinyl acetate copolymer, said copolymer having a vinyl acetate content of 24 to 26% by weight and an ethylene content of from 74 to 76% by weight.

References Cited

UNITED STATES PATENTS

| 2,733,225 | 1/1956 | Smith. | |
| 3,178,381 | 4/1965 | Mills | 1117—158 |
| 3,178,383 | 4/1965 | Stout. | |
| 3,205,186 | 9/1965 | Zaayenga | 117—158 |
| 3,245,930 | 4/1966 | McDowell et al. | |
| 3,371,057 | 2/1968 | Guhman. | |
| 3,371,057 | 2/1968 | Guttman. | |

MORRIS LIEBMAN, Primary Examiner
S. L. FOX, Assistant Examiner

U.S. Cl. X.R.
117—155, 158